United States Patent
Tubbesing et al.

(10) Patent No.: US 9,002,275 B2
(45) Date of Patent: Apr. 7, 2015

(54) MOBILE WIRELESS COMMUNICATIONS DEVICE PROVIDING BLUETOOTH SWITCHOVER FEATURES BASED UPON NEAR FIELD COMMUNICATION (NFC)

(71) Applicant: BlackBerry Limited, Waterloo (CA)

(72) Inventors: Stefan Tubbesing, Bochum (DE); Fahd Imtiaz, Kitchener (CA); Sanjay Nathwani, Mississauga (CA)

(73) Assignee: BlackBerry Limited, Waterloo, ON (CA)

(*) Notice: Subject to any disclaimer, the term of this patent is extended or adjusted under 35 U.S.C. 154(b) by 0 days.

(21) Appl. No.: 13/953,034

(22) Filed: Jul. 29, 2013

(65) Prior Publication Data
US 2015/0031288 A1     Jan. 29, 2015

(51) Int. Cl.
*H04B 7/00*     (2006.01)
*H04W 4/00*     (2009.01)
*H04B 5/02*     (2006.01)
*H01Q 11/12*     (2006.01)

(52) U.S. Cl.
CPC .................. *H04W 4/008* (2013.01); *H04B 5/02* (2013.01); *H04M 2250/02* (2013.01); *H04M 2250/04* (2013.01)

(58) Field of Classification Search
USPC ................................................ 455/41.1–41.3
See application file for complete search history.

(56) References Cited

U.S. PATENT DOCUMENTS

| 8,432,262 B2 | 4/2013 | Talty et al. |
| 2003/0114104 A1 | 6/2003 | Want et al. |
| 2011/0183614 A1 | 7/2011 | Tamura |
| 2014/0087705 A1* | 3/2014 | Wooster et al. ............... 455/416 |

FOREIGN PATENT DOCUMENTS

| DE | 102011011843 | 3/2012 |
| WO | 2013098262 | 7/2013 |

OTHER PUBLICATIONS

"BlackBerry Java 701 SDK" https://github.com/blackberry/Eclipse-JDE; pp. 1-9. Printed Jul. 5, 2013.
"Bluetooth Profile" en.wikipedia.org/wiki/blutooth_profile; pp. 1-15. Printed Jul. 5, 2013.

* cited by examiner

*Primary Examiner* — Lee Nguyen
(74) *Attorney, Agent, or Firm* — Guntin & Gust, PLC; Andrew Gust

(57) ABSTRACT

A mobile wireless communications device may include a near field communication (NFC) transceiver, a Bluetooth transceiver, and a controller coupled with the NFC transceiver and the Bluetooth transceiver. The controller may be configured to communicate with a first Bluetooth device via the Bluetooth transceiver using at least one Bluetooth profile supported by the first Bluetooth device, communicate with a second Bluetooth device via the NFC transceiver and determine if the at least one Bluetooth profile is also supported by the second Bluetooth device, and when the at least one Bluetooth profile is also supported by the second Bluetooth device, cease using the at least one Bluetooth profile with the first Bluetooth device and begin using the at least one Bluetooth profile with the second Bluetooth device.

20 Claims, 7 Drawing Sheets

MOBILE WIRELESS COMMUNICATIONS DEVICE PROVIDING BLUETOOTH SWITCHOVER FEATURES BASED UPON NEAR FIELD COMMUNICATION (NFC)

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

With NFC technology becoming more widely adopted, it is now used with portable wireless communications devices in association with other short-range wireless communications, such as a wireless Bluetooth connection. For example, an NFC connection may be used to establish a wireless Bluetooth connection in which data for establishing the Bluetooth connection is initially communicated.

DETAILED DESCRIPTION

Figure 1:
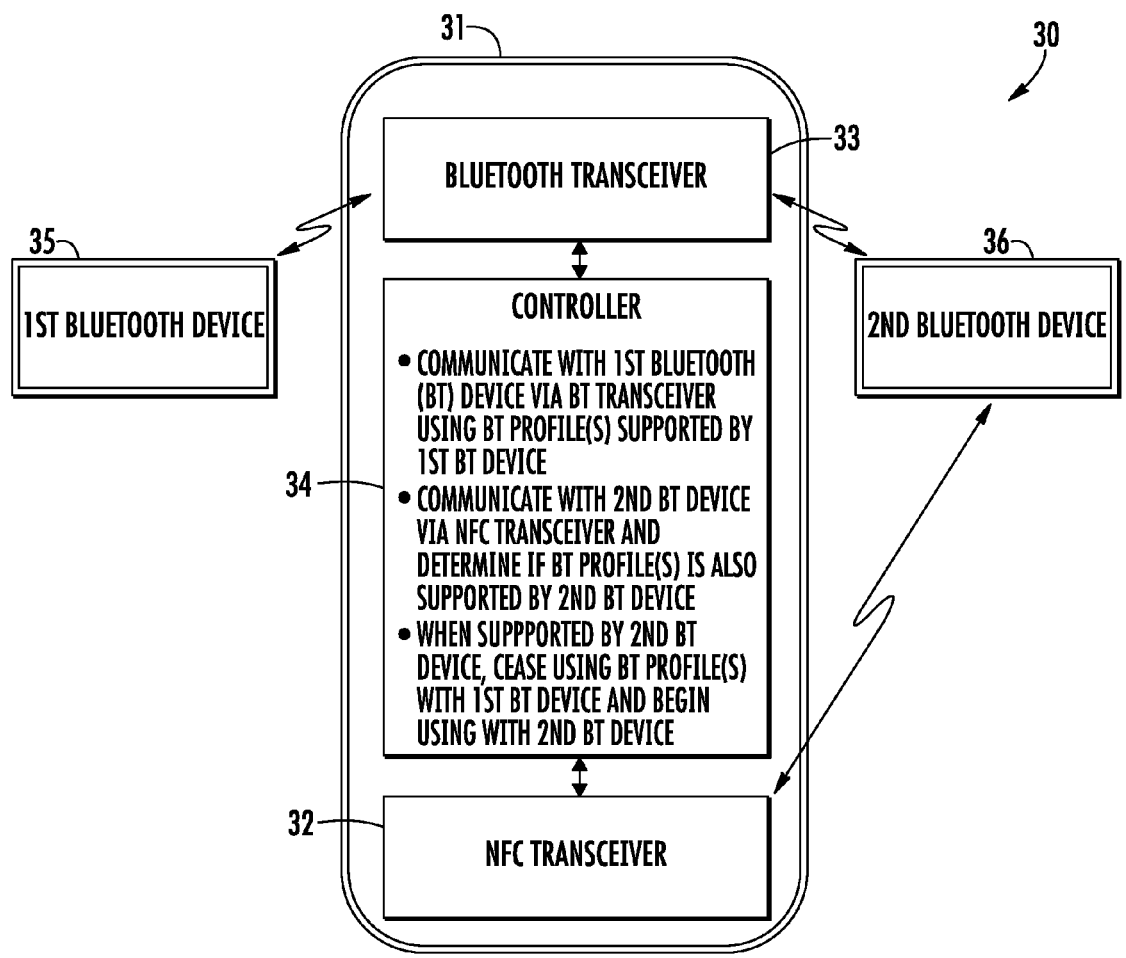
FIG. 1 is a schematic block diagram of a mobile wireless communications device in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device may include a near field communication (NFC) transceiver, a Bluetooth transceiver, and a controller coupled with the NFC transceiver and the Bluetooth transceiver. The controller may be configured to communicate with a first Bluetooth device via the Bluetooth transceiver using at least one Bluetooth profile supported by the first Bluetooth device, communicate with a second Bluetooth device via the NFC transceiver and determine if the at least one Bluetooth profile is also supported by the second Bluetooth device, and when the at least one Bluetooth profile is also supported by the second Bluetooth device, cease using the at least one Bluetooth profile with the first Bluetooth device and begin using the at least one Bluetooth profile with the second Bluetooth device. As such, a seamless switchover between the first and second Bluetooth devices may be provided.

More particularly, the controller may be configured to not cease using at least one other Bluetooth profile supported by the first Bluetooth device and not supported by the second Bluetooth device. Furthermore, the controller may be configured to cease using the at least one Bluetooth profile with the first Bluetooth device and begin using the at least one Bluetooth profile with the second Bluetooth device without user intervention. In an example embodiment, a display may be coupled with the controller, and the controller may be configured to display a connection confirmation with respect to the second Bluetooth device on the display.

The controller may further be configured to determine if the second Bluetooth device has been previously paired with the mobile wireless communications device based upon NFC communications therewith. More particularly, the controller may be configured to initiate a pairing attempt with the second Bluetooth device when the second Bluetooth device has not been previously paired with the mobile wireless communications device, and to determine if the at least one Bluetooth profile is also supported by the second Bluetooth device based upon the initiated pairing attempt. By way of example, the controller may be configured to determine if the at least one Bluetooth profile is also supported by the second Bluetooth device based upon a service discovery protocol (SDP).

A method for using a mobile wireless communications device, such as the one described briefly above, is also provided. The method may include communicating with a first Bluetooth device via the Bluetooth transceiver using at least one Bluetooth profile supported by the first Bluetooth device, communicating with a second Bluetooth device via the NFC transceiver and determining if the at least one Bluetooth profile is also supported by the second Bluetooth device, and when the at least one Bluetooth profile is also supported by the second Bluetooth device, ceasing using the at least one Bluetooth profile with the first Bluetooth device and beginning using the at least one Bluetooth profile with the second Bluetooth device.

A related non-transitory computer-readable medium is for a mobile wireless communications device, such as the one described briefly above. The non-transitory computer-readable medium may have computer-executable instructions for causing the mobile wireless communications device to at least communicate with a first Bluetooth device via the Bluetooth transceiver using at least one Bluetooth profile supported by the first Bluetooth device, communicate with a second Bluetooth device via the NFC transceiver and determine if the at least one Bluetooth profile is also supported by the second Bluetooth device, and when the at least one Bluetooth profile is also supported by the second Bluetooth device, cease using the at least one Bluetooth profile with the first Bluetooth device and begin using the at least one Bluetooth profile with the second Bluetooth device.

Figure 2A:
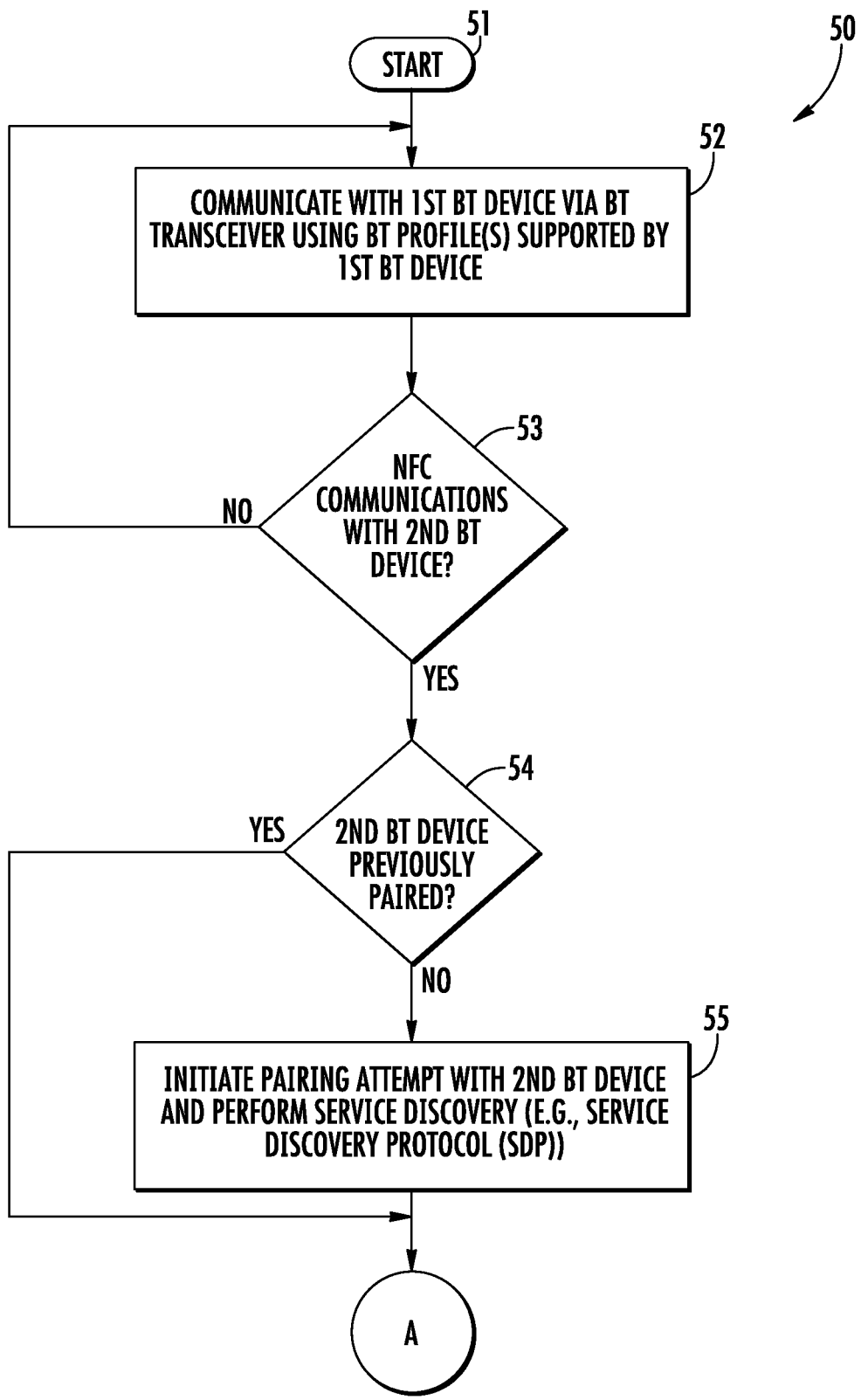
FIGS. 2A and 2B show respective upper and lower portions of a flow diagram illustrating method aspects associated with the mobile wireless communications device of FIG. 1.
Figure 2B:
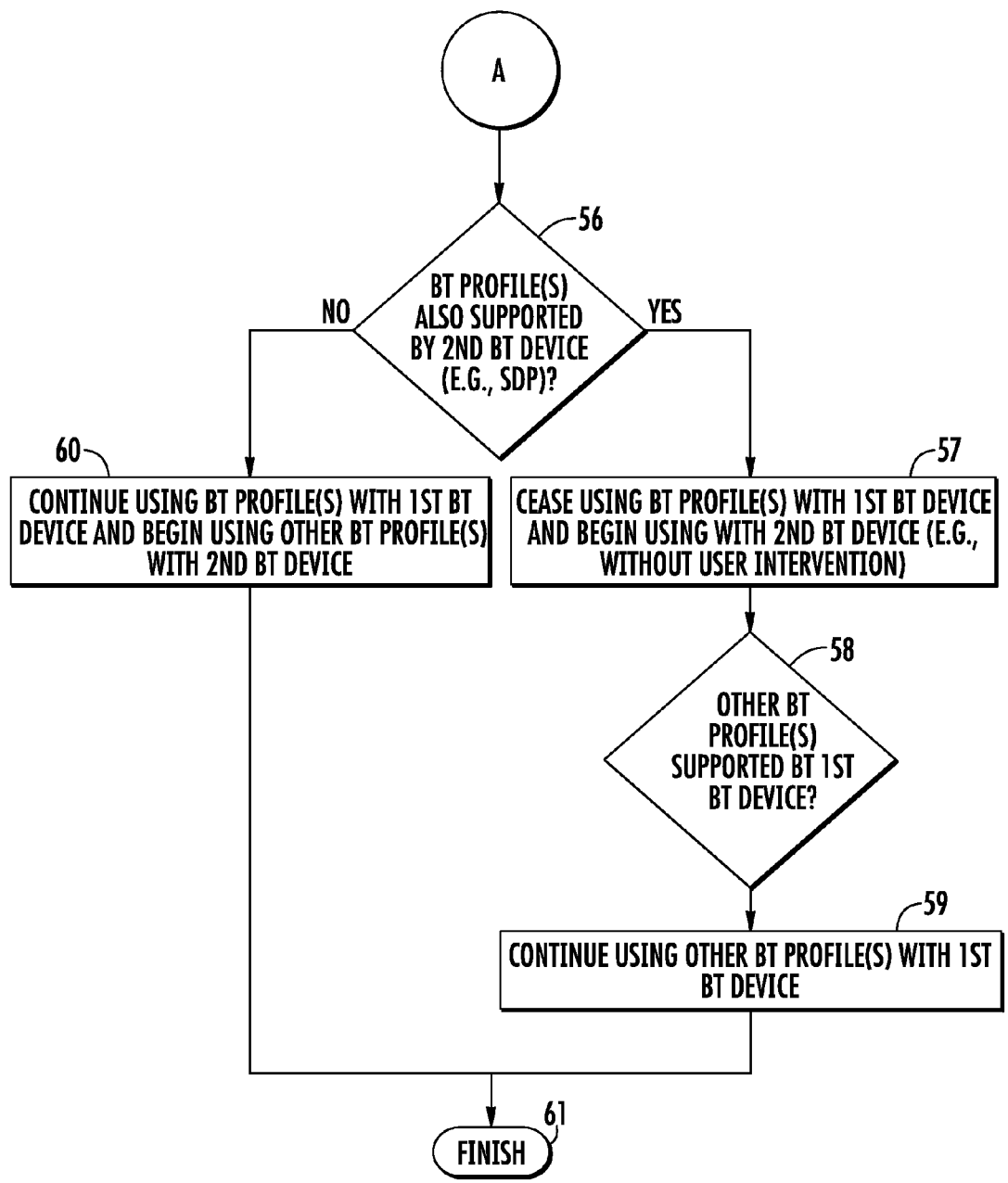

Referring initially to FIGS. 1, 2A and 2B, a system 30 illustratively including a mobile wireless communications device 31 (also referred to as a "mobile device" herein) and related method aspects are first described. The mobile device 31 illustratively includes a near field communication (NFC) transceiver 32, a Bluetooth transceiver 33, and a controller 34 coupled with the NFC transceiver and the Bluetooth transceiver. Example mobile devices 31 may include portable or personal media players (e.g., music or MP3 players, video players, etc.), portable gaming devices, portable or mobile telephones, smartphones, tablet computers, digital cameras, etc. The controller 34 may be implemented using a combination of hardware (e.g., microprocessor(s), etc.) and a non-transitory computer-readable medium having computer-executable instructions for causing the mobile device 32 to perform the various operations discussed herein.

By way of background, NFC is a short-range wireless communications technology in which NFC-enabled devices are "swiped," "bumped", "tapped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used. Bluetooth is also a relatively short-range wireless technology standard, but with an effective of range of up to several meters. The Bluetooth technology standard is set forth in the various Bluetooth Core Specifications (e.g., v1.0, v1.0B, v1.1, v1.2, v2.0+EDR, v2.1+EDR, v3.0+HS, v4.0, etc.) from the Bluetooth Special Interest Group.

Beginning at Block 51 of the flow diagram 50, the controller 34 may be configured to communicate with a first Bluetooth device 35 via the Bluetooth transceiver 33 using one or more Bluetooth profiles supported by the first Bluetooth device (Block 52). Bluetooth profiles define specific aspects of Bluetooth wireless communication between devices. A given Bluetooth device will be compatible with the appropriate subset of Bluetooth profiles for the desired services (e.g., audio/video distribution, file transfer, etc.). A Bluetooth profile resides on top of the Bluetooth Core Specification and (optionally) additional protocols. Example Bluetooth profiles may include, but are not limited to, the following: Advanced Audio Distribution Profile (A2DP); Attribute Profile (ATT); Audio/Video Remote Control Profile (AVRCP); Basic Imaging Profile (BIP); Basic Printing Profile (BPP); Common ISDN Access Profile (CIP); Cordless Telephony Profile (CTP); Device ID Profile (DIP); Dial-up Networking Profile (DUN); Fax Profile (FAX); File Transfer Profile (FTP); Generic Audio/Video Distribution Profile (GAVDP); Generic Access Profile (GAP); Generic Attribute Profile (GATT); Generic Object Exchange Profile (GOEP); Hard Copy Cable Replacement Profile (HCRP); Health Device Profile (HDP); Hands-Free Profile (HFP); Human Interface Device Profile (HID); Headset Profile (HSP); Intercom Profile (ICP); LAN Access Profile (LAP); Message Access Profile (MAP); OBject Exchange (OBEX); Object Push Profile (OPP); Personal Area Networking Profile (PAN); Phone Book Access Profile (PBAP, PBA); Proximity Profile (PXP); Serial Port Profile (SPP); Service Discovery Application Profile (SDAP); SIM Access Profile (SAP, SIM, rSAP); Synchronization Profile (SYNCH); Video Distribution Profile (VDP); and Wireless Application Protocol Bearer (WAPB).

While the Bluetooth standards allow for simultaneous connection to multiple Bluetooth-enabled devices, problems may occur when switching between two different Bluetooth devices that both support (i.e., use) the same Bluetooth profiles. More particularly, if the first Bluetooth device 35 was connected with the mobile device 31 using an audio profile such as A2DP, if the mobile device was tapped with a second Bluetooth device 36 that also supported A2DP to initiate a Bluetooth connection therewith via NFC, under current Bluetooth configurations the A2DP profile would remain connected to the first Bluetooth device, irrespective of whether the user of the mobile device wanted to instead have audio or video functionality with the second Bluetooth device. Considered differently, under current implementations the given profile(s) connected to the first Bluetooth device 35 (A2DP in the present example) would be locked with the first Bluetooth device 35, and to connect this profile with the second Bluetooth device 36 the user would have to manually disconnect the connection with both devices, and then re-initiate a new connection with the second Bluetooth device. Example Bluetooth devices may include other mobile devices, desktop computers, keyboards, a mouse, track pads, headsets, headphones, etc.

In accordance with one example embodiment, when an NFC "tap" with a second Bluetooth device 31 is initiated, the controller 34 cooperates with the NFC transceiver 32 to initiate NFC communication with the second Bluetooth device, at Block 53, to thereby perform a Bluetooth handover (e.g., via a static or dynamic NFC connection handover). The controller 34 may then determine if the second Bluetooth device 36 has been previously paired with the mobile device 31, at Block 54, based upon the NFC communications. That is, the controller 34 may maintain a list of Bluetooth devices with which the mobile device 31 has previously been paired, as well as the appropriate credentials to initiate a Bluetooth connection with such devices, as will be appreciated by those skilled in the art. If a previous pairing has not occurred, the controller 54 may initiate a pairing attempt with the second Bluetooth device 36, and determine if the Bluetooth profile(s) in use by the first Bluetooth device 35 is also supported by the second Bluetooth device 36 based upon the initiated pairing attempt, at Block 55. By way of example, the controller 34 may perform the discovery of the supported Bluetooth profiles based upon a Bluetooth service discovery protocol (SDP), for example.

With the Bluetooth profiles supported by the second Bluetooth device 36 being known either as a result of the pairing sequence, or from a prior pairing sequence, the controller 34 may then determine if the Bluetooth profile(s) currently connected with the first Bluetooth device 35 is also supported by the second Bluetooth device 36, at Block 56. When there is an overlap between a supported Bluetooth profile(s), the controller 34 may accordingly cease using or drop the overlapping Bluetooth profile(s) with the first Bluetooth device 35 and begin using the Bluetooth profile(s) with the second Bluetooth device, at Block 57. More particularly, this may be done "automatically" by the controller 34, without the necessity of user intervention, such as by prompting the user to authorize the switch over (although a user prompt could be used in some embodiments, if desired).

As such, a seamless switchover between the first and second Bluetooth devices 35, 36 may be provided, without the necessity for the user to manually disconnect from the first Bluetooth device to free up the given Bluetooth profile(s), and disconnect and re-connected the second Bluetooth device 36 to then use the given Bluetooth profile(s) with the second Bluetooth device. That is, the above-described configuration provides the ability to connect to the second Bluetooth device 36 via NFC while already connected to the first Bluetooth device 35, and thereby seamlessly switch Bluetooth devices with an NFC tap.

In some embodiments, for Bluetooth profiles that are supported by the first Bluetooth device 35 and not by the second Bluetooth device 36, the mobile device 31 may maintain the connection to the first Bluetooth accessory with these non-overlapping profile(s), at Blocks 58-59. More particularly, the controller 34 may be configured to not cease using another Bluetooth profile(s) supported by the first Bluetooth device 35 and not supported by (i.e., not overlapping with) the second Bluetooth device 36, as will be discussed further below. However, if the second Bluetooth device 36 does not support any Bluetooth profiles that overlap (i.e., are shared in common with) with the first Bluetooth device 35, then the Bluetooth profiles connected or in use with the first Bluetooth device may remain in use with the first Bluetooth device, and the other Bluetooth profiles supported by the second Bluetooth device may be connected or used with the second Bluetooth device simultaneously, at Block 60. The method shown in FIGS. 2A-2B is illustratively concluded at Block 61.

Figure 3:
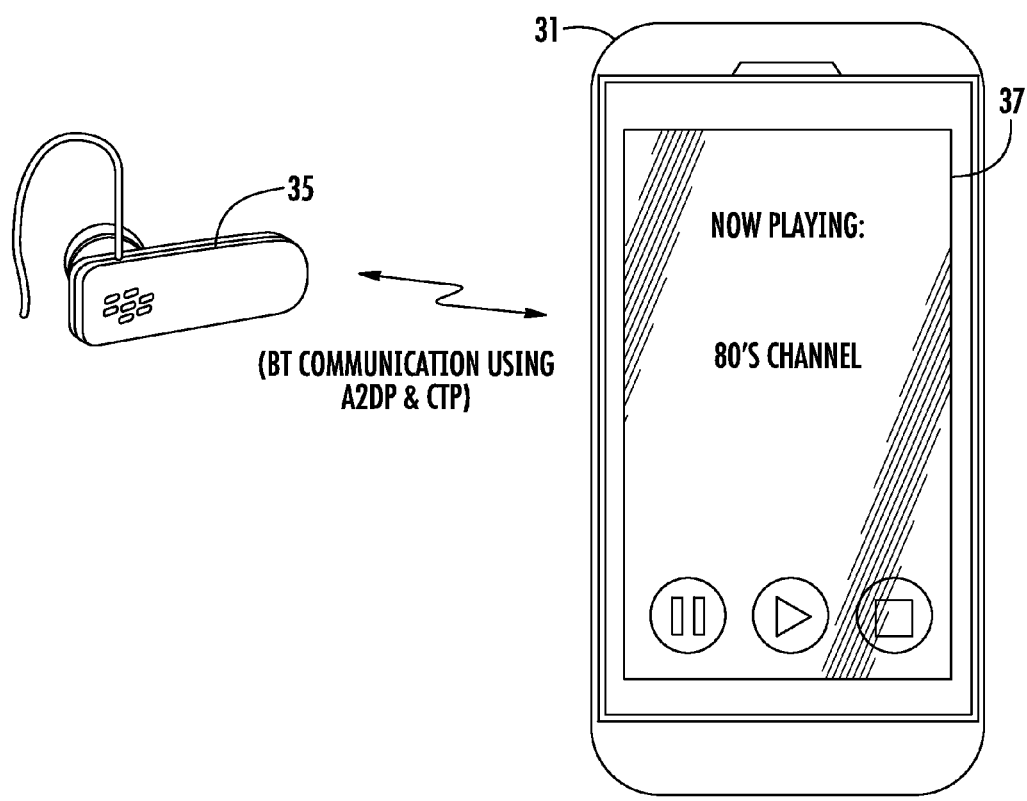
FIGS. 3-5 are a series of schematic diagrams illustrating a use case for a mobile wireless communications device in accordance with an example embodiment.
Figure 4:
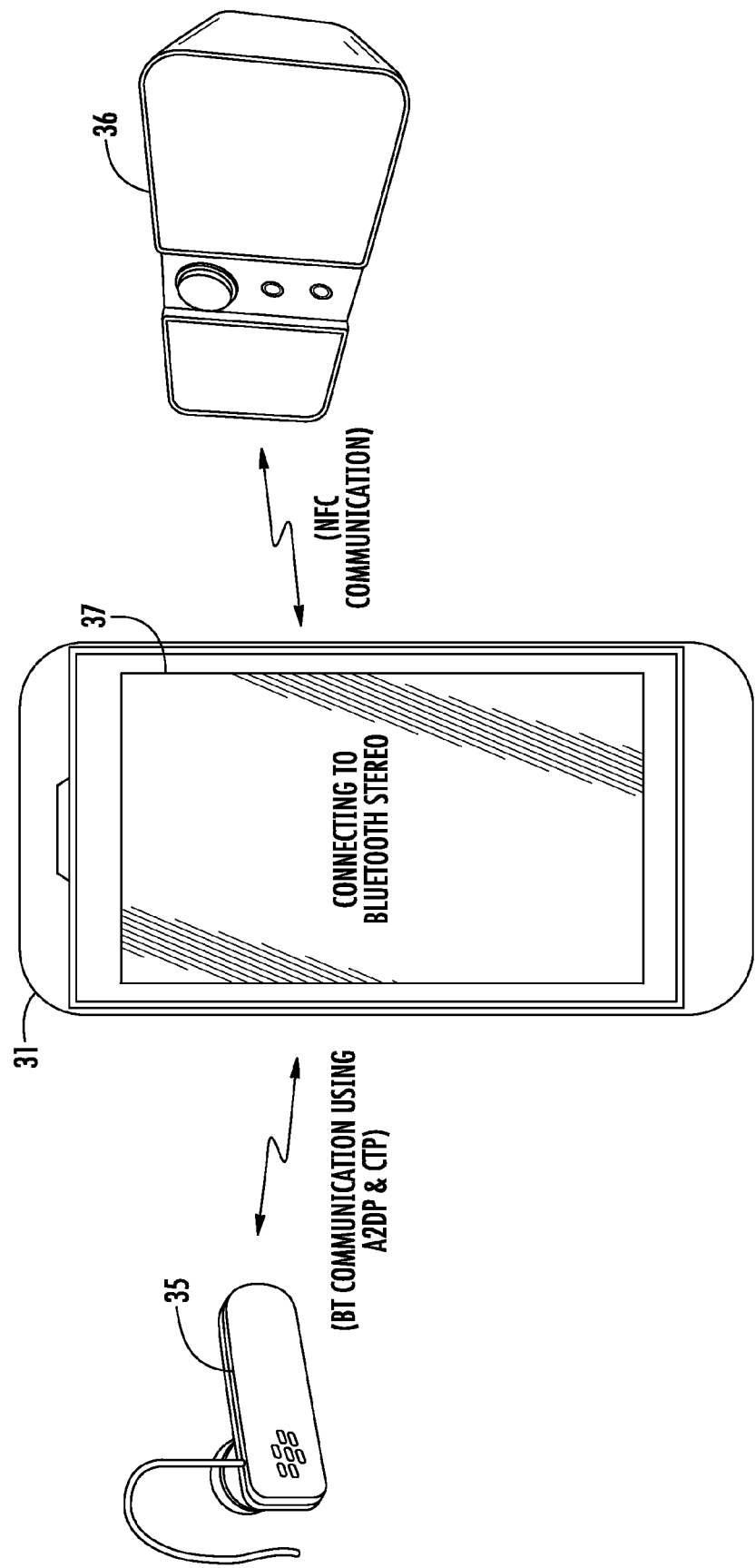
Figure 5:
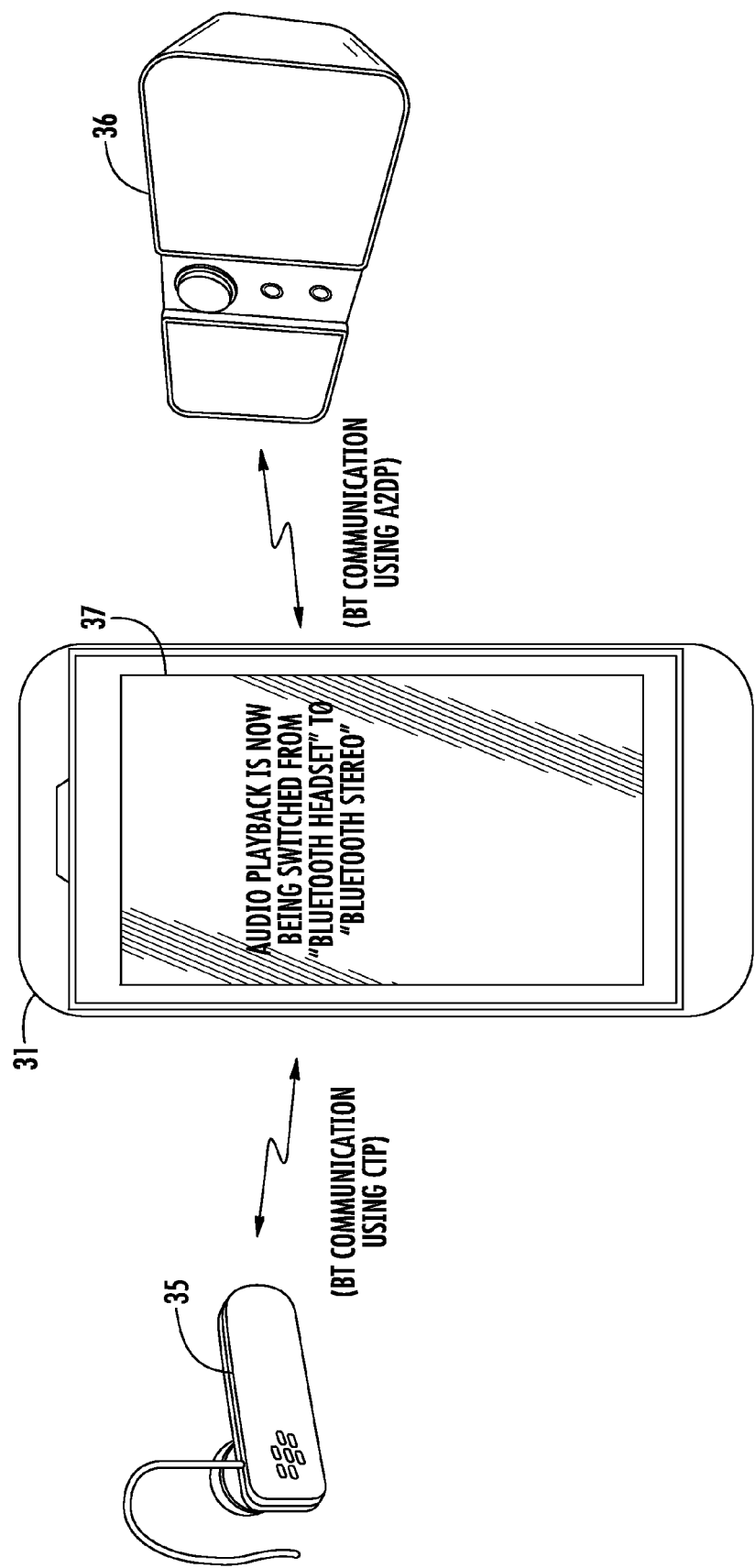

The foregoing will be further understood with reference to an example illustrated in FIGS. 3-5. In the example embodiment, the mobile device 31 is a smartphone which illustratively includes a display 37 coupled with the controller 34 (not shown in FIGS. 3-5). In the first instance (FIG. 3), the mobile device 31 is connected with the first Bluetooth device 35 (here a Bluetooth headset) using three Bluetooth profiles, namely A2DP, AVRCP, and CTP, and the mobile device is streaming music (here the "80's Channel") to the first Bluetooth device.

At a second time (FIG. 4), a user connects to the second Bluetooth device 36 (here a Bluetooth stereo) via an NFC tap. The controller 34 optionally displays a "toast" on the display 37 saying "Connecting to Bluetooth Stereo", as shown. If the second Bluetooth device 36 is already in the paired device list on the mobile device 31, as discussed above, the controller 34 disconnects the profiles supported by the second Bluetooth device from the first Bluetooth device 35, which in the present example are A2DP and AVRCP, and initiates a connection using these supported profiles with the second Bluetooth device (FIG. 5). The controller 34 optionally displays a toast confirming successful connection to the second Bluetooth device 36 on the display 37, namely that "Audio playback is now being switched from 'Bluetooth Headset' to 'Bluetooth Stereo'". As noted above, if the second Bluetooth device 36 were not already paired with the mobile device 31, the NFC tap would initiate a pairing attempt towards the second Bluetooth device through which its supported profiles would be discovered (e.g., through SDP records, etc.).

However, since the second Bluetooth device 36 does not support the CTP profile in this example, the controller 37 leaves this profile connected with the first Bluetooth device 35. Thus, music streaming from the mobile device 31 is switched over to the second Bluetooth device 36 so that the music instead plays through the Bluetooth stereo, but voice calls, etc., are still routed to the first Bluetooth device 35 via the CTP profile, as will be appreciated by those skilled in the art.

Example components of a mobile communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may include a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
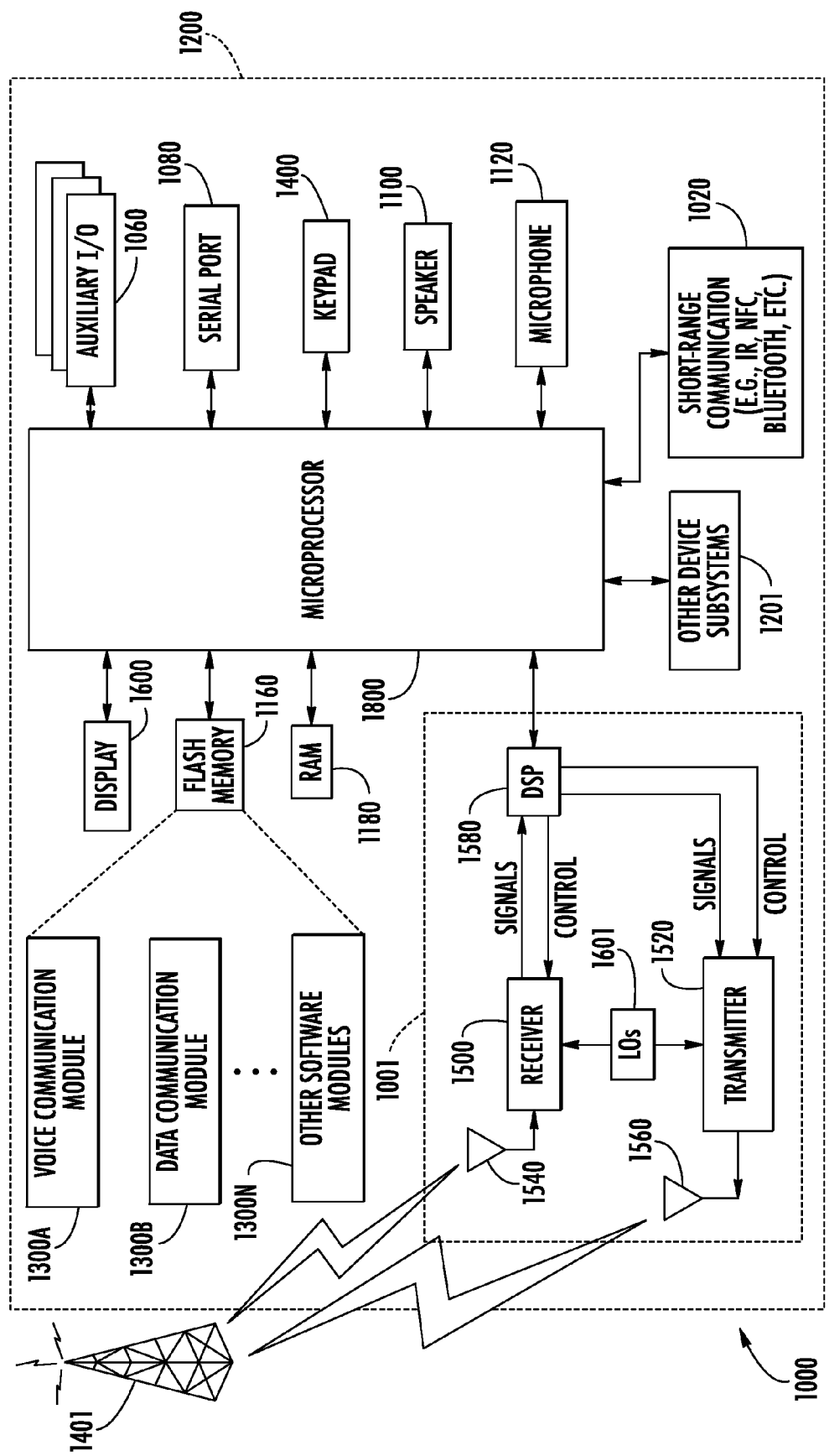
FIG. 6 is a schematic block diagram illustrating example components which may be used with the mobile wireless communications devices of FIGS. 1 and 3-5.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (CPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, LTE, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a near field communication (NFC) transceiver;
a Bluetooth transceiver; and
a controller coupled with said NFC transceiver and said Bluetooth transceiver, said controller configured to
communicate with a first Bluetooth device via said Bluetooth transceiver using at least one Bluetooth profile supported by the first Bluetooth device,
communicate with a second Bluetooth device via said NFC transceiver and determine if the at least one Bluetooth profile is also supported by the second Bluetooth device, and
when the at least one Bluetooth profile is also supported by the second Bluetooth device, cease using the at least one Bluetooth profile with the first Bluetooth device and begin using the at least one Bluetooth profile with the second Bluetooth device.

2. The mobile wireless communications device of claim 1 wherein said controller is configured to not cease using at least one other Bluetooth profile supported by the first Bluetooth device and not supported by the second Bluetooth device.

3. The mobile wireless communications device of claim 1 wherein said controller is configured to cease using the at least one Bluetooth profile with the first Bluetooth device and begin using the at least one Bluetooth profile with the second Bluetooth device without user intervention.

4. The mobile wireless communications device of claim 1 further comprising a display coupled with said controller; and wherein said controller is configured to display a connection confirmation with respect to the second Bluetooth device on said display.

5. The mobile wireless communications device of claim 1 wherein said controller is further configured to determine if the second Bluetooth device has been previously paired with the mobile wireless communications based upon NFC communications therewith.

6. The mobile wireless communications device of claim 5 wherein said controller is further configured to initiate a pairing attempt with the second Bluetooth device when the second Bluetooth device has not been previously paired with the mobile wireless communications device, and to determine if the at least one Bluetooth profile is also supported by the second Bluetooth device based upon the initiated pairing attempt.

7. The mobile wireless communications device of claim 6 wherein said controller is configured to determine if the at least one Bluetooth profile is also supported by the second Bluetooth device based upon a service discovery protocol (SDP).

8. A method for using a mobile wireless communications device comprising a near field communication (NFC) transceiver and a Bluetooth transceiver, the method comprising:
communicating with a first Bluetooth device via the Bluetooth transceiver using at least one Bluetooth profile supported by the first Bluetooth device;
communicating with a second Bluetooth device via the NFC transceiver and determining if the at least one Bluetooth profile is also supported by the second Bluetooth device; and
when the at least one Bluetooth profile is also supported by the second Bluetooth device, ceasing using the at least one Bluetooth profile with the first Bluetooth device and beginning using the at least one Bluetooth profile with the second Bluetooth device.

9. The method of claim 8 further comprising not ceasing using at least one other Bluetooth profile supported by the first Bluetooth device and not supported by the second Bluetooth device when the at least one Bluetooth profile is also supported by the second Bluetooth device.

10. The method of claim 8 wherein ceasing comprises ceasing using the at least one Bluetooth profile with the first Bluetooth device and beginning using the at least one Bluetooth profile with the second Bluetooth device without user intervention.

11. The method of claim 8 wherein the mobile wireless communications device further comprises a display coupled with the controller; and further comprising displaying a connection confirmation with respect to the second Bluetooth device on the display.

12. The method of claim 8 further comprising determining if the second Bluetooth device has been previously paired with the mobile wireless communications based upon NFC communications therewith.

13. The method of claim 12 further comprising initiating a pairing attempt with the second Bluetooth device when the second Bluetooth device has not been previously paired with the mobile wireless communications device; and wherein determining comprises determining if the at least one Bluetooth profile is also supported by the second Bluetooth device based upon the initiated pairing attempt.

14. The method of claim 13 wherein determining comprises determining if the at least one Bluetooth profile is also supported by the second Bluetooth device based upon a service discovery protocol (SBP).

15. A non-transitory computer-readable medium for a mobile wireless communications device comprising a near field communication (NFC) transceiver and a Bluetooth transceiver, the non-transitory computer-readable medium having computer-executable instructions for causing the mobile wireless communications device to at least:
communicate with a first Bluetooth device via the Bluetooth transceiver using at least one Bluetooth profile supported by the first Bluetooth device;
communicate with a second Bluetooth device via the NFC transceiver and determine if the at least one Bluetooth profile is also supported by the second Bluetooth device; and
when the at least one Bluetooth profile is also supported by the second Bluetooth device, cease using the at least one Bluetooth profile with the first Bluetooth device and begin using the at least one Bluetooth profile with the second Bluetooth device.

16. The non-transitory computer-readable medium of claim 15 further comprising computer-executable instructions for causing the mobile wireless communications device to not cease using at least one other Bluetooth profile supported by the first Bluetooth device and not supported by the second Bluetooth device when the at least one Bluetooth profile is also supported by the second Bluetooth device.

17. The non-transitory computer-readable medium of claim 15 wherein ceasing comprises ceasing using the at least one Bluetooth profile with the first Bluetooth device and beginning using the at least one Bluetooth profile with the second Bluetooth device without user intervention.

18. The non-transitory computer-readable medium of claim 15 wherein the mobile wireless communications device further comprises a display coupled with the controller; and further comprising computer-executable instructions for causing the mobile wireless communications device to display a connection confirmation with respect to the second Bluetooth device on the display.

19. The non-transitory computer-readable medium of claim 15 further comprising computer-executable instructions for causing the mobile wireless communications device to determine if the second Bluetooth device has been previously paired with the mobile wireless communications based upon NFC communications therewith.

20. The non-transitory computer-readable medium of claim 19 further comprising computer-executable instructions for causing the mobile wireless communications device to initiate a pairing attempt with the second Bluetooth device when the second Bluetooth device has not been previously paired with the mobile wireless communications device, and determine if the at least one Bluetooth profile is supported by the second Bluetooth device based upon the initiated pairing attempt.

* * * * *